United States Patent Office.

ALFRED L. McCARTY, OF DES MOINES, IOWA.

DENTAL ANÆSTHETIC.

SPECIFICATION forming part of Letters Patent No. 402,263, dated April 30, 1889.

Application filed January 17, 1889. Serial No. 296,650. (No specimens.)

*To all whom it may concern:*

Be it known that I, ALFRED L. McCARTY, dentist, a citizen of the United States of America, and a resident of Des Moines, in the county of Polk and State of Iowa, have invented a new and useful Anæsthetic, of which the following is a specification.

My object is to provide a simple, safe, efficient, and convenient compound specially adapted for use in the practice of dentistry; and my invention consists in compounding the following-named ingredients, in about the proportions specified, to wit: five (5) grains crystallized muriate of cocaine, six (6) drops of chloroform, six (6) drops of extract of staphisagria, three (3) drops of oil of cloves, and three (3) drams of water. These ingredients are thoroughly mixed to produce a volatile fluid that can be readily put in vials, to be therein placed on the market for sale, and readily applied locally and hypodermically for all the purposes for which an anæsthetic is adapted.

By adding the staphisagria the compound is greatly improved as an obtunder.

While the compound can be advantageously applied externally by simply wetting the surface of an affected part of the body, it is specially adapted for use in extracting teeth.

To prevent pain in using the forceps for extracting teeth, I inject about five (5) minims of the anæsthetic into the gums on each side of a tooth before I apply the forceps.

What I claim, and desire to secure by Letters Patent of the United States, is—

The herein-described compound to be used as an anæsthetic, consisting of crystallized muriate of cocaine, chloroform, fluid extract of staphisagria, (staves-acre,) oil of cloves, and water, in about the proportions specified.

ALFRED L. McCARTY.

Witnesses:
MARTIN P. SMITH,
THOMAS G. ORWIG.